US008637181B2

(12) United States Patent
Kim et al.

(10) Patent No.: US 8,637,181 B2
(45) Date of Patent: Jan. 28, 2014

(54) TERMINAL AND RECHARGEABLE BATTERY AND METHOD OF ASSEMBLING THE SAME

(75) Inventors: Dukjung Kim, Yongin-si (KR); Sangwon Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 263 days.

(21) Appl. No.: 13/019,857

(22) Filed: Feb. 2, 2011

(65) Prior Publication Data

US 2012/0058388 A1   Mar. 8, 2012

(30) Foreign Application Priority Data

Sep. 8, 2010   (KR) .............................. 2010-0088021

(51) Int. Cl.
*H01M 2/04* (2006.01)

(52) U.S. Cl.
USPC ........... 429/178; 429/121; 429/122; 429/123; 429/170; 429/181

(58) Field of Classification Search
USPC .................. 429/121–123, 170, 178–179, 181
See application file for complete search history.

(56) References Cited

U.S. PATENT DOCUMENTS

| 2007/0053140 A1* | 3/2007 | Soliz ............................. 361/502 |
| 2009/0186269 A1* | 7/2009 | Kim et al. ..................... 429/179 |
| 2009/0214947 A1* | 8/2009 | Huang .......................... 429/179 |
| 2010/0081048 A1* | 4/2010 | Nansaka et al. .............. 429/158 |

FOREIGN PATENT DOCUMENTS

| JP | 2009-105075 A | 5/2009 |
| JP | 2009-252395 | 10/2009 |
| JP | 2010-040533 A | 2/2010 |
| KR | 10-2001-0017098 A | 3/2001 |

OTHER PUBLICATIONS

Korean Office action dated Mar. 28, 2012 issued to Korean priority patent application No. 10-2010-0088021, 5 pages.
Machine Translation of JP 2009-05075 A, 12 pages, Dated May 14, 2009.
Machine Translation of JP 2010-040533 A, 14 pages, Date Feb. 18, 2010.

* cited by examiner

*Primary Examiner* — Patrick Ryan
*Assistant Examiner* — Ben Lewis
(74) *Attorney, Agent, or Firm* — Christie, Parker & Hale, LLP (57) ABSTRACT

A terminal of a rechargeable battery includes a collector terminal electrically coupled to an electrode assembly located within a case, wherein the collector terminal protrudes from the case; a terminal plate located outside of the case and coupled to the collector terminal; and a coupling terminal coupled to the terminal plate.

10 Claims, 7 Drawing Sheets

TERMINAL AND RECHARGEABLE BATTERY AND METHOD OF ASSEMBLING THE SAME

CROSS-REFERENCE TO RELATED APPLICATION

This application claims priority to Korean patent Application No. 2010-0088021 filed on Sep. 8, 2010, in the Korean Intellectual Property Office, the entire disclosure of which is hereby incorporated by reference.

BACKGROUND

1. Field

An embodiment of the present invention relates to a terminal of a rechargeable battery and a method of assembling the same.

2. Description of Related Art

In general, a rechargeable battery may be recharged and used for various small portable electronic devices such as mobile phones, camcorders, and the like. High capacity batteries connected to several tens of battery cells used as the power source for driving motors, such as those for electric scoopers, hybrid electric vehicles (HEVs), electric motor vehicles, and the like.

Rechargeable batteries are manufactured in various shapes exemplified by cylindrical and prismatic types. The rechargeable battery is constructed by injecting an electrode assembly including a positive electrode plate, a negative electrode plate and a separator serving as an insulator interposed therebetween, and an electrolyte in a can and installing a cap plate in the case. A positive electrode terminal and a negative electrode terminal are connected to the electrode assembly, which is then exposed or protruded to the outside through the cap plate.

SUMMARY

Embodiments of the present invention provide a terminal of a rechargeable battery, which can increase durability and mechanical and electrical reliability of the terminal by coupling a collector terminal and a terminal plate to each other by riveting, or coupling a terminal plate and a coupling terminal to each other by riveting, and a method of assembling the same.

Embodiments of the present invention provide a terminal of a rechargeable battery, which can improve current collecting efficiency and a coupling force by forming a collector terminal and a coupling terminal separately, and a method of assembling the same.

Embodiments of the present invention provide a terminal of a rechargeable battery, which can provide a wide current path and reduce electric resistance of the terminal by transferring a current passing through a collector terminal to a bus bar through a terminal plate having a relatively large sectional area, and a method of assembling the same.

Embodiments of the present invention provide a terminal of a rechargeable battery, which can easily achieve assembling irrespective of the material used to make the terminal, by assembling a collector terminal and a terminal plate to each other by riveting, or assembling a terminal plate and a coupling terminal to each other by riveting, and a method of assembling the same.

One embodiment of the present invention provides a terminal of a rechargeable battery includes a collector terminal electrically coupled to an electrode assembly located within a case, wherein the collector terminal protrudes from the case; a terminal plate located outside of the case and coupled to the collector terminal; and a coupling terminal coupled to the terminal plate.

In embodiments, the collector terminal passes through the terminal plate and is riveted thereto and the terminal plate passes through the coupling terminal and is riveted thereto. Additionally, the terminal plate may include a terminal body having a throughhole through which the collector terminal extends and a coupling groove in which the coupling terminal is seated; and at least one coupling protrusion protruding from the coupling groove and coupled to the coupling terminal. In one embodiment, the coupling protrusion of the terminal plate passes through the coupling terminal and is riveted thereto.

In one embodiment, the coupling terminal includes a coupling body having a throughhole through which the coupling terminal extends; and a bolt portion extending from the coupling body. Additionally, the coupling terminal may include a coupling body coupled to the terminal plate; and a bolt portion extending from the coupling body. The terminal plate and the coupling terminal may be made from the same material or different materials. Further, an insulation member may be located between the terminal plate and the case.

In another embodiment, a method of assembling a terminal of a rechargeable battery is provided, the method including coupling a terminal plate to a collector terminal protruding from a case and riveting the collector terminal to the terminal plate; and coupling a coupling terminal to the terminal plate and riveting the terminal plate to the coupling terminal. In one embodiment, at least one coupling protrusion is formed in the terminal plate, the coupling protrusion extending through the coupling terminal and being riveted thereto.

According to embodiments of the present invention, since a collector terminal and a terminal plate are coupled to each other by riveting, or a terminal plate and a coupling terminal are coupled to each other by riveting, durability and mechanical and electrical reliability of the terminal can be can maximized.

According to embodiments of the present invention, since a collector terminal and a coupling terminal are formed separately, current collecting efficiency and a coupling force can be improved.

According to embodiments of the present invention, since a current passing through a collector terminal is transferred to a bus bar through a terminal plate having a relatively large sectional area, a wide current path can be provided and electric resistance of the terminal can be minimized.

According to embodiments of the present invention, since a collector terminal and a terminal plate are assembled to each other by riveting, or a terminal plate and a coupling terminal are assembled to each other by riveting, assembling can be easily achieved irrespective of the material used to make each terminal.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

Hereinafter, examples of embodiments of the invention will be described in detail with reference to the accompanying drawings such that they can easily be made and used by those skilled in the art. However, the invention is not limited to the examples of embodiments described, but can be embodied in various forms.

Figure 1:
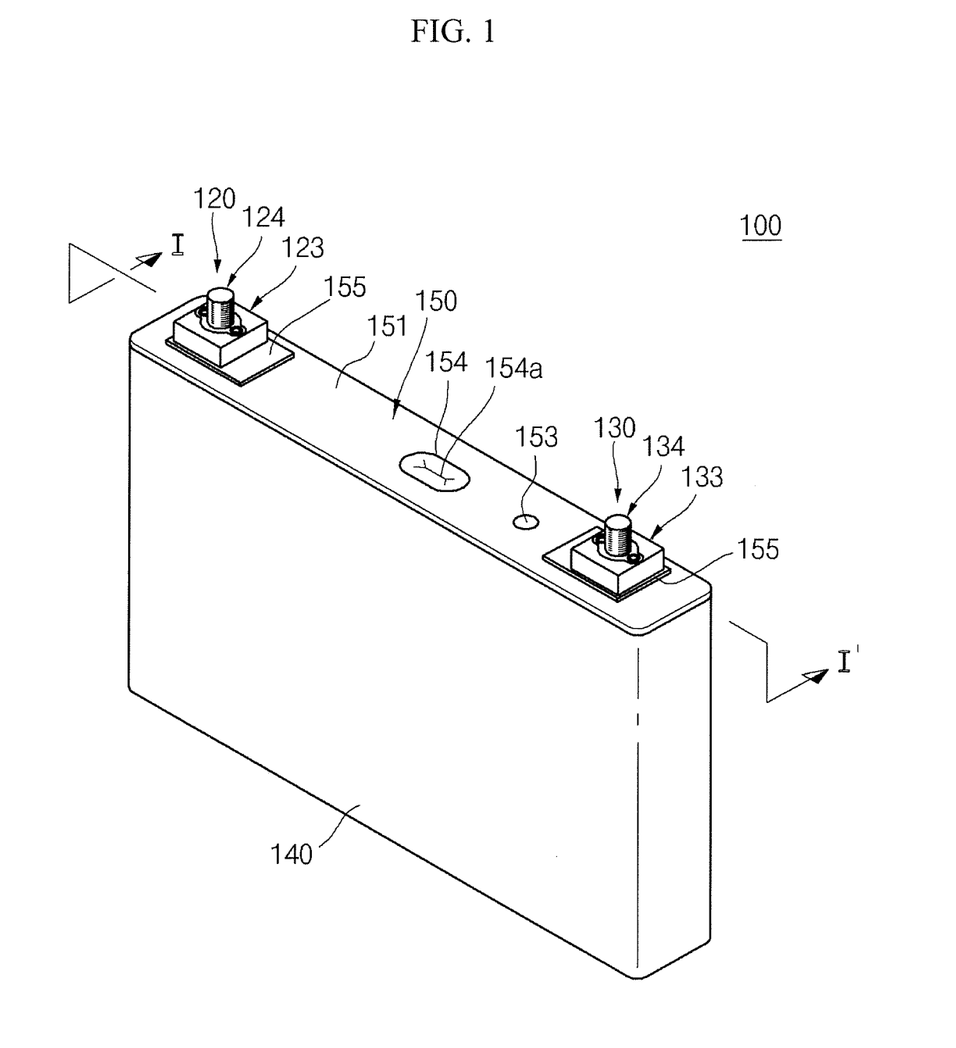
FIG. 1 is a perspective view of a rechargeable battery according to an embodiment of the present invention.
Figure 2:
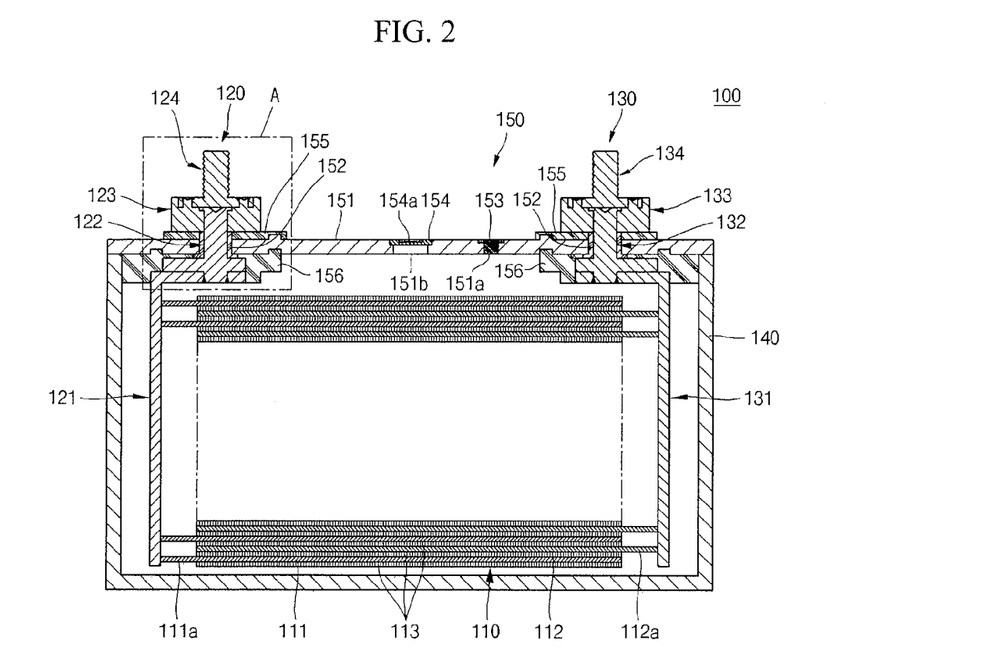
FIG. 2 is a cross-sectional view of the rechargeable battery, taken along the line I-I' of FIG. 1.
Figure 3:
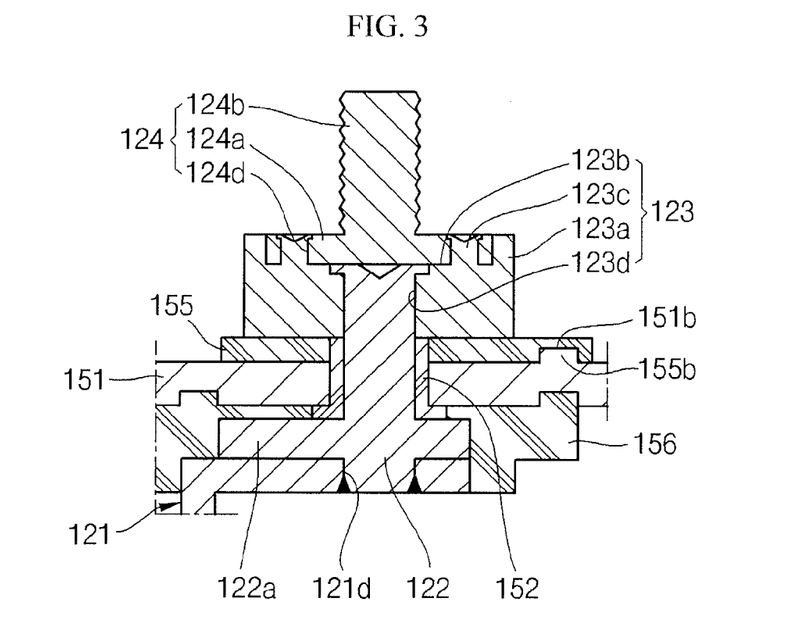
FIG. 3 is an enlarged cross-sectional view of a portion 'A' shown in FIG. 2.

FIG. 1 is a perspective view of a rechargeable battery according to an embodiment of the present invention, FIG. 2 is a cross-sectional view of the rechargeable battery, taken along the line I-I' of FIG. 1, and FIG. 3 is an enlarged cross-sectional view of a portion 'A' shown in FIG. 2.

As shown in FIGS. 1 through 3, the rechargeable battery 100 according to the illustrated embodiment includes an electrode assembly 110, a first terminal 120, a second terminal 130, a case 140, and a cap assembly 150.

The electrode assembly 110 is formed by winding or laminating a stacked structure of a first electrode plate 111 shaped as a thin plate or layer, a separator 113, and a second electrode plate 112. Here, the first electrode plate 111 may act as a negative electrode, and the second electrode plate 112 may act as a positive electrode, and vice versa.

The first electrode plate 111 is formed by coating a first electrode active material such as graphite or carbon on a first electrode collector formed of a metal foil such as copper or nickel, and includes a first electrode uncoated portion 111a that is not coated with the first electrode active material. The first electrode uncoated portion 111a becomes a path of a current flowing between the first electrode plate 111 and the outside of the first electrode plate 111. However, the material of the first electrode plate 111 is not limited to the example materials illustrated herein.

The second electrode plate 112 is formed by coating a second electrode active material such as a transition metal oxide on a second electrode collector formed of a metal foil such as aluminum, and includes a second electrode uncoated portion 112a that is not coated with the second electrode active material. The second electrode uncoated portion 112a becomes a path of a current flowing between the second electrode plate 112 and the outside of the second electrode plate 112. However, the material of the second electrode plate 112 is not limited to the example materials illustrated herein.

Alternatively, the polarities of the aforementioned first and second electrode plates 111 and 112 may be reversed.

The separator 113 is located between the first electrode plate 111 and the second electrode plate 112 and serves to prevent electrical shorts and allow passage of only lithium ions. The separator 113 may be made of polyethylene, polypropylene, or a composite film of polyethylene and polypropylene. However, the material of the separator 113 is not limited to the example materials illustrated herein.

The first terminal 120 and the second terminal 130 electrically connected to the first electrode plate 111 and the second electrode plate 112, respectively, are coupled to both ends of the electrode assembly 110.

The electrode assembly 110 is housed in the case 140 together with an electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. In addition, the electrolyte may be in a liquid, solid, or gel phase.

The first terminal 120 may be generally made of a metal or equivalents thereof, and is electrically connected to the first electrode plate 111. The first terminal 120 includes a first collector plate 121, a first collector terminal 122, a first terminal plate 123 and a first coupling terminal 124.

The first collector plate 121 contacts the first electrode uncoated portion 111a protruding from one end of the electrode assembly 110. In one embodiment, the first collector plate 121 is welded to the first electrode uncoated portion 111a. The first collector plate 121 is formed in a substantially 'L' shape, and has a terminal hole 121d formed at its top surface. The first collector terminal 122 is fitted into the terminal hole 121d to be engaged therein. The first collector plate 121 is made of, for example, copper or a copper alloy, but aspects of the present invention are not limited to the material of the first collector plate 121 listed herein.

The first collector terminal 122 passes through a cap plate 151 to be described later and protrudes upward, i.e., away from the electrode assembly 110. In addition, the first collector terminal 122 is electrically connected to the first collector plate 121 under the cap plate 151. The first collector terminal 122 protrudes upward from the cap plate 151, and includes a laterally extending flange 122a formed under the cap plate 151 to prevent the first collector terminal 122 from significantly deviating from the cap plate 151. A portion of the first collector terminal 122, which is formed under the flange 122a, is fitted into the terminal hole 121d of the first collector plate 121 to then be welded thereto. In addition, a portion of the first collector terminal 122, which is formed on the flange 122a, is fixed to the first terminal plate 123. In other words, a top end of the first collector terminal 122 is coupled to the first terminal plate 123 to be described later and then riveted. Here, the first collector terminal 122 is electrically insulated from the cap plate 151. The first collector terminal 122 may be made of, for example, at least one selected from copper, a copper alloy, and equivalents thereof, but aspects of the present invention are not limited to the material of the first collector terminal 122 listed herein.

The first terminal plate 123 includes a terminal body 123a, and at least one coupling protrusion 123c. The terminal body 123a is formed to have a substantially hexahedral shape, and has a throughhole 123d formed at its center in a substantially vertical direction to allow the first collector terminal 122 to pass therethrough. In addition, a coupling groove 123b is formed approximately on the terminal body 123a to allow the first coupling terminal 124 to be seated therein. Further, the at least one coupling protrusion 123c protrudes upward from the coupling groove 123b. The coupling protrusion 123c is formed at the coupling groove 123b on either side of the throughhole 123d. In addition, the first terminal plate 123 may be made of at least one selected from stainless steel, copper, a copper alloy, aluminum, an aluminum alloy, and equivalents thereof, but aspects of the present invention are not limited to the material of the first terminal plate 123 listed herein. In addition, the first terminal plate 123 and the cap plate 151 are insulated from each other.

The first collector terminal 122 and the first terminal plate 123 are fixedly coupled to each other. In other words, after the first collector terminal 122 passes through the throughhole 123d of the first terminal plate 123, a top end of the first collector terminal 122 is riveted. Therefore, the first collector terminal 122 and the first terminal plate 123 are firmly coupled to each other mechanically and electrically. Here, the top end of the first collector terminal 122 is coplanar with or recessed from the coupling groove 123b of the first terminal plate 123. Accordingly, coupling or connection between the first terminal plate 123 and the first coupling terminal 124 does not interfere with the first collector terminal 122.

The first coupling terminal 124 includes a coupling body 124a and a bolt portion 124b. The coupling body 124a is coupled to the coupling groove 123b provided in the first terminal plate 123. The coupling body 124a is substantially board- or plate-shaped. The coupling body 124a is closely adhered to the first collector terminal 122 and the first terminal plate 123 mechanically and electrically. In addition, the coupling body 124a is formed substantially at opposite sides of the bolt portion 124b to be substantially symmetrical. Further, the coupling body 124a includes a throughhole 124d to allow the coupling protrusion 123c provided in the first terminal plate 123 to pass therethrough to then be coupled. In other words, the throughhole 124d is formed in the coupling body 124a and extends along sides of the bolt portion 124b. The bolt portion 124b protrudes upwards from the coupling body 124a, and includes a plurality of threads formed on its surface. The first coupling terminal 124 may be made of at least one selected from stainless steel, copper, a copper alloy, aluminum, an aluminum alloy, and equivalents thereof, but aspects of the present invention does not limit the material of the first coupling terminal 124 to those listed herein.

The first terminal plate 123 and the first coupling terminal 124 are fixedly coupled to each other. In other words, the coupling body 124a of the first coupling terminal 124 is coupled to the coupling groove 123b of the first terminal plate 123. In addition, after the coupling protrusion 123c formed in the first terminal plate 123 passes through the throughhole 124d formed in the coupling body 124a of the first coupling terminal 124, a top end of the coupling protrusion 123c is riveted. Therefore, the first terminal plate 123 and the first coupling terminal 124 are firmly coupled to each other mechanically and electrically. In one embodiment, the top end of the coupling protrusion 123c is coplanar with or recessed from the top surface of the coupling body 124a. Accordingly, electrical and mechanical contacts between the first terminal plate 123 and a bus bar do not interfere with the coupling protrusion 123c.

The second terminal 130 is also made of a metal or equivalents thereof, and is electrically connected to the second electrode plate 112. The second terminal 130 includes a second collector plate 131, a second collector terminal 132, a second terminal plate 133, and a second coupling terminal 134. In one embodiment, the shape of the second terminal 130 may be substantially the same as that of the first terminal 120, and a description thereof will be omitted. The second collector plate 131 and the second collector terminal 132 may generally be made of aluminum, an aluminum alloy, and equivalents thereof, but aspects of the present invention are not limited to the materials of the second collector plate 131 and the second collector terminal 132 listed herein. In addition, the second terminal plate 133 and the second coupling terminal 134 may generally be made of at least one selected from stainless steel, aluminum, an aluminum alloy, copper, a copper alloy, and equivalents thereof, but aspects of the present invention are not limited to the material of the second terminal plate 133 and the second coupling terminal 134 listed herein.

The second terminal plate 133 may be electrically connected to the cap plate 151. Thus, the case 140 and the cap plate 151, which will be described below, may have the same polarity as the second terminal 130 (for example, a positive polarity.)

As described above, according to the illustrated embodiment, the collector terminal 122, 132 and the terminal plate 123, 133 are coupled to each other by riveting, and the terminal plate 123, 133 and the coupling terminal 124, 134 are coupled to each other by riveting, thereby improving the durability and electrical and mechanical reliability of the terminal.

In addition, according to the illustrated embodiment, the collector terminal 122, 132 and the coupling terminal 124, 134 are separately formed, and the collector terminal 122, 132 that collects electricity from the electrode assembly, and the coupling terminal 124, 134 mechanically coupled with a bus bar are separately provided. Therefore, the collecting efficiency and coupling force of the rechargeable battery can both be improved. In addition, even if the collector terminal 122, 132 and the coupling terminal 124, 134 are separately formed, they have substantially the same center axis. Therefore, widths of the first and second terminals 120 and 130 can be maintained to be relatively small.

Further, according to the illustrated embodiment, a current passing through the collector terminal 122, 132 is transferred to a bus bar through the terminal plate 123, 133 having a relatively large sectional area so that a current path can be relatively wide and electrical resistance of the terminal 120, 130 can be minimized.

In addition, according to the illustrated embodiment, since the collector terminal 122, 132, the terminal plate 123, 133, and the coupling terminal 124, 134 are all assembled by riveting, they can be easily assembled regardless of the material used (stainless steel, copper, a copper alloy, aluminum, or an aluminum alloy, among others).

In one embodiment, the case 140 is made of a conductive metal such as aluminum, an aluminum alloy or nickel plated steel, and has a substantially hexahedral shape having an opening in which the electrode assembly 110, the first terminal 120 and the second terminal 130 are housed. Since FIG. 2 shows that the case 140 is coupled to the cap assembly 150, the opening is not illustrated in FIG. 2. However, the opening is a substantially opened portion of the periphery of the cap assembly 150. The interior surface of the case 140 is insulated, so that the case 140 can be insulated from the electrode assembly 110, the first terminal 120, the second terminal 130 and the cap assembly 150.

The cap assembly 150 is coupled to the case 140. In detail, the cap assembly 150 includes a cap plate 151, a seal gasket 152, plug 153, a safety vent 154, an upper insulation member 155, and a lower insulation member 156. The seal gasket 152, the upper insulation member 155 and the lower insulation member 156 may also be components of the first terminal 120 and the second terminal 130.

The cap plate 151 seals an opening of the case 140 and may be made of the same material as the case 140. For example, the cap plate 151 may be coupled to the case 140 by laser welding. As described above, since the cap plate 151 may have the same polarity as the second terminal 130, the cap plate 151 and the case 140 may have the same polarity.

The seal gasket 152 is formed between each of the first collector terminal 122 and the second collector terminal 132 and the cap plate 151 using an insulating material, and seals regions therebetween. The seal gasket 152 prevents external moisture from being permeated into the rechargeable battery 100 or the electrolyte contained in the rechargeable battery 100 from flowing out.

The plug 153 seals an electrolyte injection hole 151a of the cap plate 151, and the safety vent 154 is installed in a vent hole 151b of the cap plate 151, and a notch 154a may be formed to be openable at a predetermined pressure.

The upper insulation member 155 is formed between each of the first terminal plate 123 and the second terminal plate 133 and the cap plate 151. In addition, the upper insulation member 155 is closely adhered to the cap plate 151. Moreover, the upper insulation member 155 may also be closely adhered to the seal gasket 152. The upper insulation member 155 insulates each of the first terminal plate 123 and the second terminal plate 133 from the cap plate 151.

The lower insulation member 156 is formed between each of the first collector plate 121 and the second collector plate 131 and the cap plate 151, and prevents unnecessary electrical shorts. In other words, the lower insulation member 156 prevents an electrical short between the first collector plate 121 and the cap plate 151, and an electrical short between the second collector plate 131 and the cap plate 151. In addition, the lower insulation member 156 is formed between each of the first collector terminal 122 and the second collector terminal 132 and the cap plate 151, thereby preventing unnecessary electrical shorts between each of the first collector terminal 122 and the second collector terminal 132 and the cap plate 151.

Figure 4:
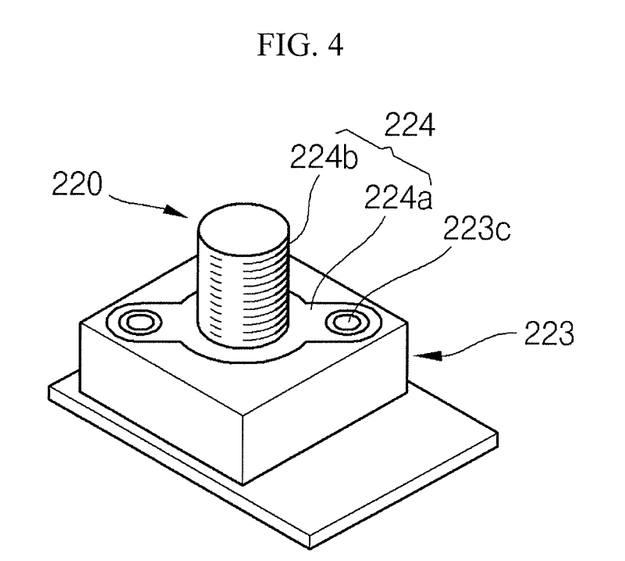
FIG. 4 is a perspective view of a terminal of a rechargeable battery according to another embodiment of the present invention.

FIG. 4 is a perspective view of a terminal of a rechargeable battery according to another embodiment of the present invention.

As shown in FIG. 4, the terminal 220 of a rechargeable battery according to the illustrated embodiment of the present invention is substantially the same as the terminal 100 according to the previous embodiment shown in FIGS. 1 through 3, except that the terminal 100 shown in FIG. 4 includes a coupling protrusion 223c formed at a location substantially corresponding to a corner of a terminal plate 123 while the terminal 100 shown in FIGS. 1 through 3 includes the coupling protrusion 123c formed at a location substantially corresponding to the center of the terminal plate 123.

Therefore, in the terminal 220 of the illustrated embodiment of the present invention, a diameter of the coupling protrusion 223c can be increased, and a coupling force between the terminal plate 223 and a coupling terminal 224 can further be enhanced.

FIGS. 5A through 5D illustrate a method of assembling of a terminal of a rechargeable battery according to an embodiment of the present invention in sequence. Since first and second terminals have the same configuration, the method of assembling of a terminal of a rechargeable battery according to an embodiment of the present invention will now be described with regard to the first terminal.

Figure 5A:
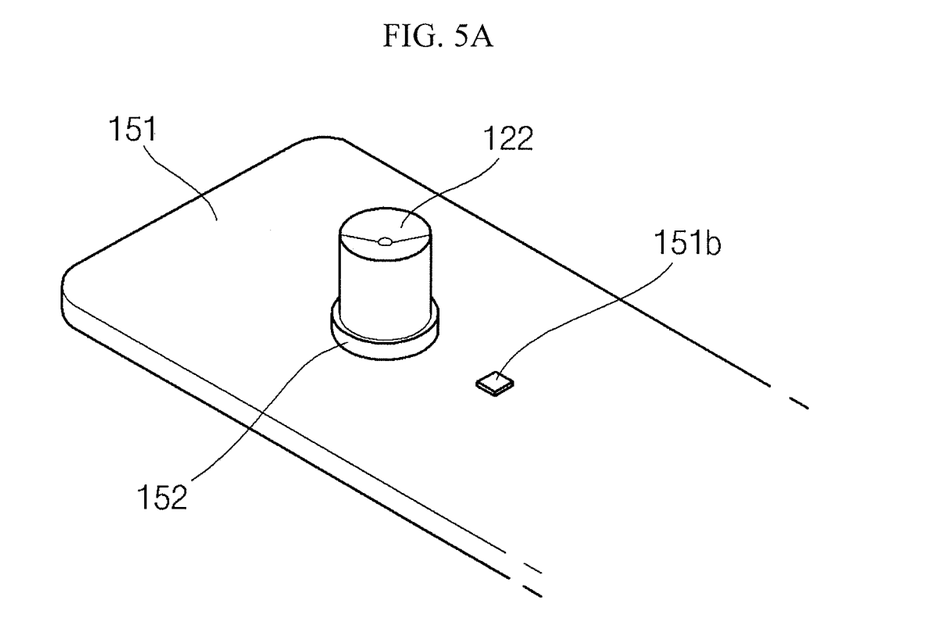
FIGS. 5A through 5D illustrate a method of assembling of a terminal of a rechargeable battery according to an embodiment of the present invention in sequence.

As shown in FIG. 5A, a first collector terminal 122 is first coupled to a cap plate 151. The first collector terminal 122 is electrically insulated from the cap plate 151 by a seal gasket 152. Here, a protrusion 151b is formed on a surface of the cap plate 151, and the protrusion 151b is engaged with a recess (155b of FIG. 3) of an upper insulation member 155 to be described later.

Figure 5B:
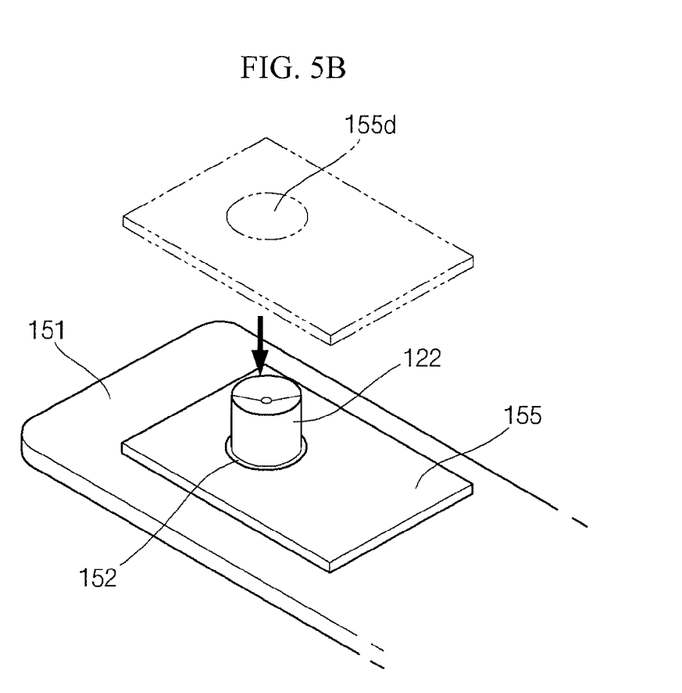

As shown in FIG. 5B, an upper insulation member 155 is coupled to the first collector terminal 122. In other words, a throughhole 155d is formed in the upper insulation member 155, and the first collector terminal 122 passes through the throughhole 155d and is coupled thereto.

The upper insulation member 155 is seated in the cap plate 151 and is coupled to the protrusion 151b. Thus, the upper insulation member 155 does not rotate about the first collector terminal 122. In addition, the first collector terminal 122 still passes through the upper insulation member 155 and upwardly extends therefrom.

Figure 5C:
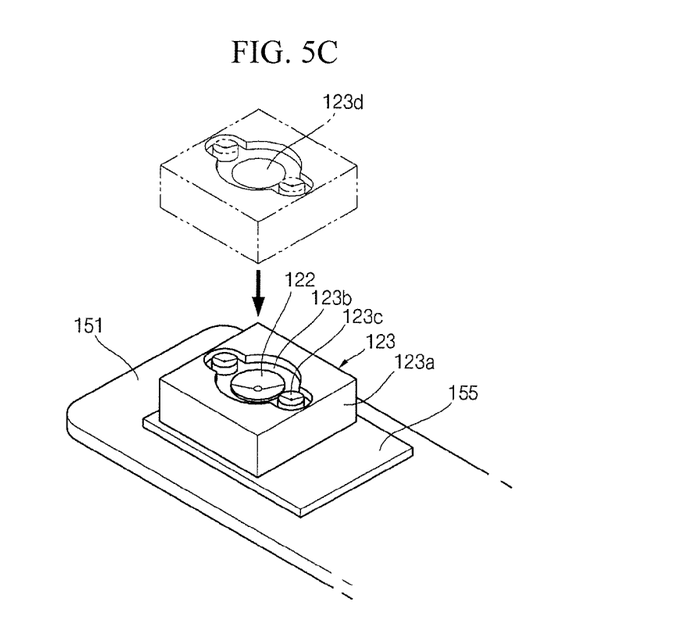

As shown in FIG. 5C, the first terminal plate 123 is coupled to the first collector terminal 122. In other words, a throughhole 123d is formed substantially at the center of a terminal body 123a of the first terminal plate 123, and the first collector terminal 122 passes through the throughhole 123d and is coupled thereto. Here, the first terminal plate 123 is closely adhered to the upper insulation member 155. Thus, the first terminal plate 123 and the cap plate 151 are electrically insulated from each other.

In addition, a top end of the first collector terminal 122 is riveted by a riveting tool. Therefore, the top end of the first collector terminal 122 is firmly fixed to the first terminal plate 123 electrically and mechanically.

Here, the first terminal plate 123 has a coupling groove 123b formed on its top surface, and the riveting makes the top end of the first collector terminal 122 substantially coplanar with a bottom of the coupling groove 123b or the top end of the first collector terminal 122 recessed from the bottom of the coupling groove 123b. Accordingly, coupling between the first terminal plate 123 and the first coupling terminal 124, which will later be described, does not interfere with the first collector terminal 122. In addition, a pair of coupling protrusions 123c are provided in the coupling groove 123b.

Figure 5D:
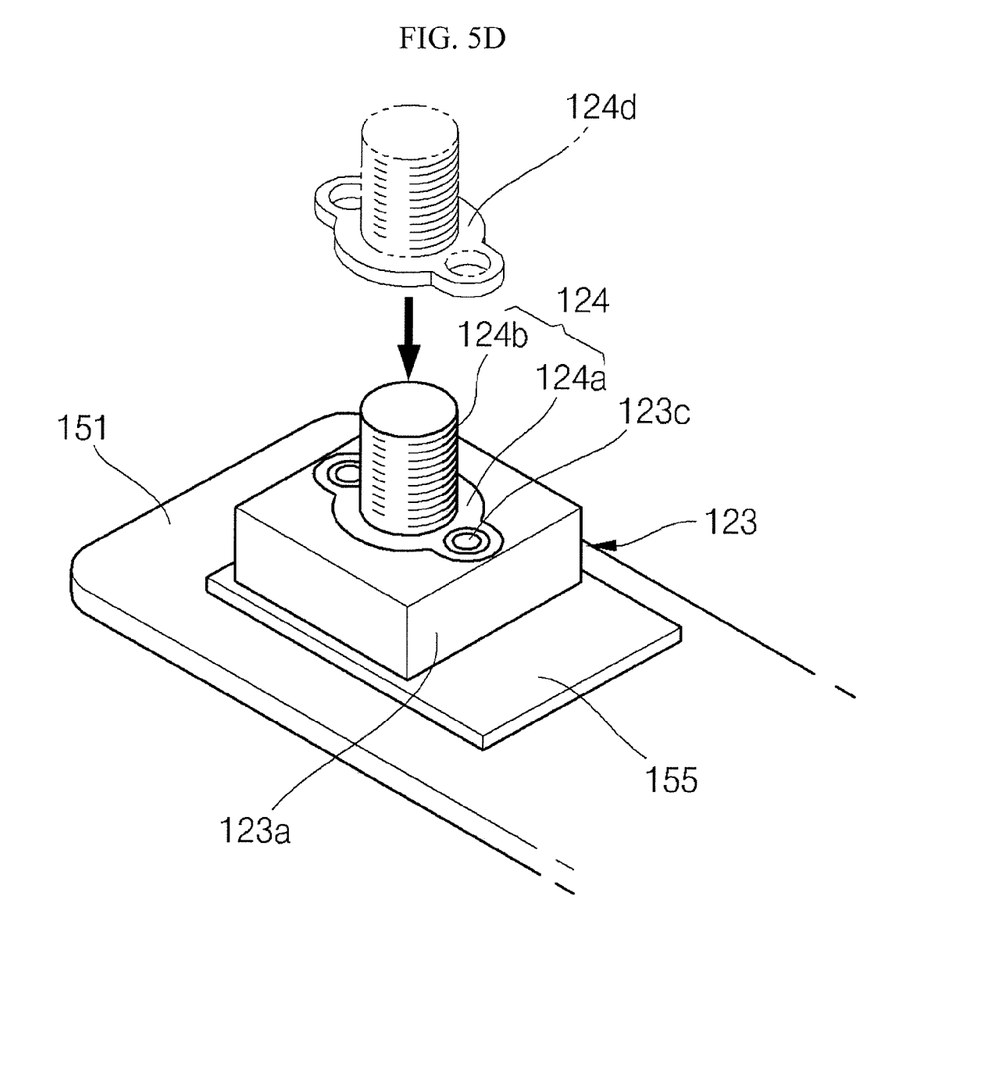

As shown in FIG. 5D, the first coupling terminal 124 is coupled to the first terminal plate 123. In other words, the coupling body 124a of the first coupling terminal 124 is coupled to the coupling groove 123b of the first terminal plate 123, and coupling protrusions 123c of the first terminal plate 123 are engaged with throughholes 124d formed in the coupling body 124a.

In addition, top ends of the coupling protrusions 123c are riveted by a riveting tool. Therefore, the first coupling terminal 124 is fixed to the first terminal plate 123 electrically and mechanically. Since the coupling protrusions 123c are provided in pair, a coupling force between the first terminal plate 123 and the first coupling terminal 124 is maximized.

In addition, the riveting makes the top ends of the coupling protrusions 123c substantially coplanar with the top end of the first terminal plate 123 or the top ends of the coupling protrusions 123c recessed from the top surface of the first terminal plate 123. Accordingly, coupling or a connection between the first terminal plate 123 and the bus bar does not interfere with the coupling protrusions 123c.

Figure 6:
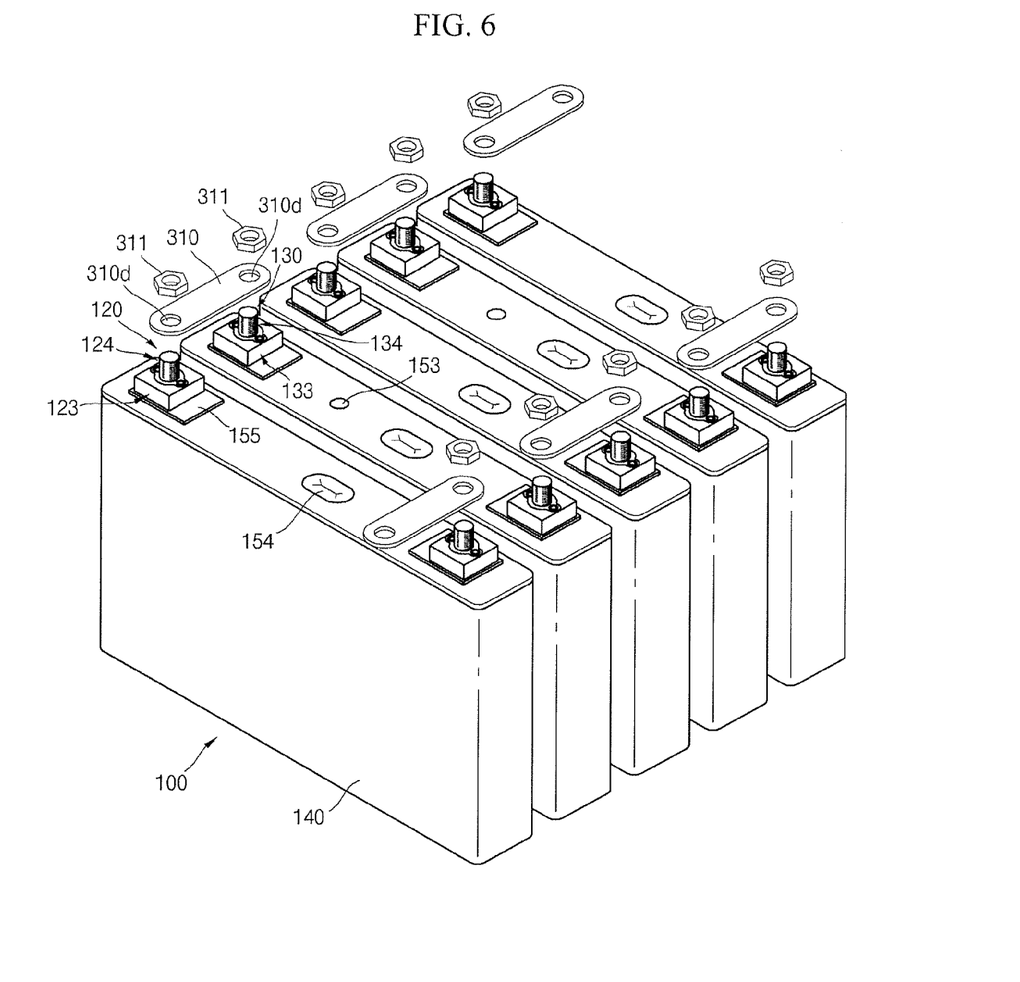
FIG. 6 illustrates a method of coupling a bus bar and a terminal of a rechargeable battery according to an embodiment of the present invention to each other.

FIG. 6 illustrates a method of coupling a bus bar and a terminal of a rechargeable battery according to an embodiment of the present invention to each other.

As shown in FIG. 6, a plurality of secondary batteries 100 may be connected in series and/or parallel to each other by a conductive bus bar 310. Here, throughholes 310d are formed at both sides of the bus bar 310, and first coupling terminal 124 and a second coupling terminal 134 provided in each of the plurality of secondary batteries 100 are coupled to the throughholes 310d. In addition, nuts 311 are coupled to the first coupling terminal 124 and the second coupling terminal 134 passing through the bus bar 310.

Accordingly, the bus bar 310 is firmly adhered to the first terminal plate 123 and the second terminal plate 133 while it is coupled to the first coupling terminal 124 or the second coupling terminal 134 using the nuts 311.

In such a manner, since a bus bar is coupled to a coupling terminal through a nut, coupling between the bus bar and the coupling terminal is established. In addition, a relatively large current path is formed through the collector terminal, the terminal plate and the bus bar, thereby reducing electrical resistance of the terminal.

Figure 7:
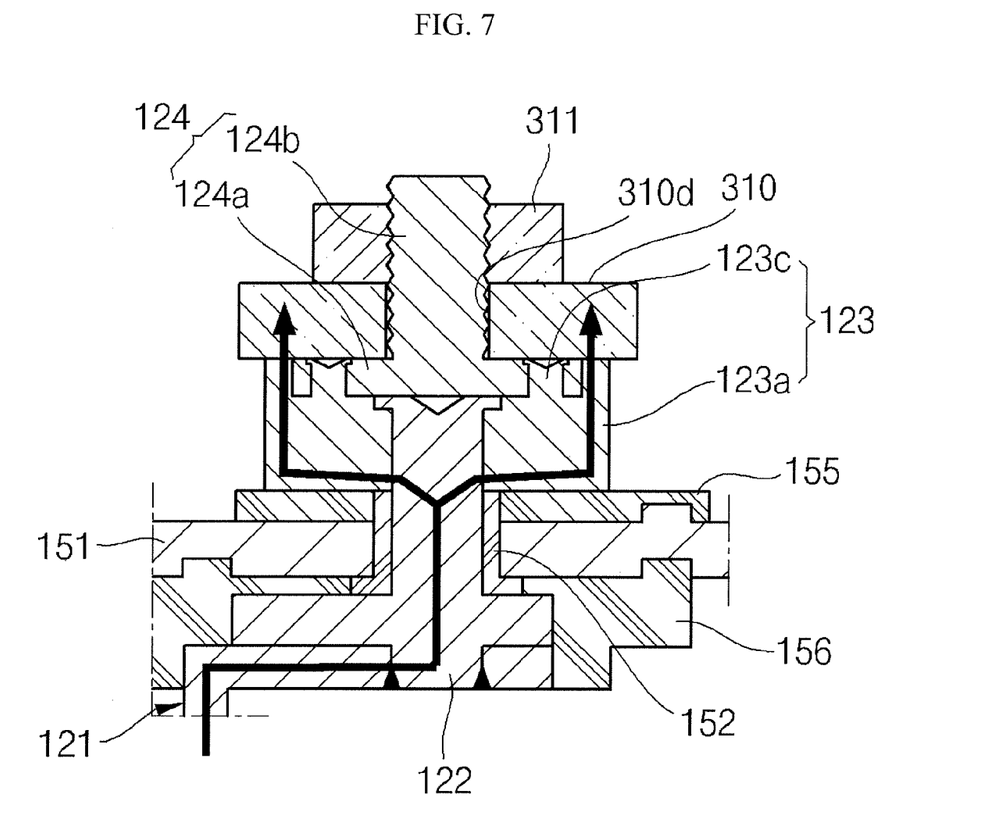
FIG. 7 is a cross-sectional view illustrating a state in which a bus bar and a terminal of a rechargeable battery according to an embodiment of the present invention are coupled to each other.

FIG. 7 is a cross-sectional view illustrating a state in which a bus bar and a terminal of a rechargeable battery according to an embodiment of the present invention are coupled to each other.

As shown in FIG. 7, a bus bar 310 is coupled to a coupling terminal 124. In other words, a bolt portion 124b of the coupling terminal 124 is coupled to a throughhole 310d of a bus bar 310. In addition, a nut 311 is coupled to the bolt portion 124b corresponding to an upper portion of the bus bar 310, thereby allowing the bus bar 310 to be firmly adhered to the terminal plate 123. Therefore, since a terminal plate 123 having a relatively large sectional area is located between the collector terminal 122 and the bus bar 310, a current path increases and contact resistance is minimized accordingly.

Meanwhile, the bus bar 310 may be made of at least one selected from stainless steel, aluminum, an aluminum alloy, copper, a copper alloy, and equivalents thereof, but the material of the bus bar 310 is not limited to the exemplary materials illustrated herein. In FIG. 7, arrows indicate discharge current paths.

As described above, the terminal plate and the coupling terminal may be made of the same material or different materials. The terminal plate and the bus bar may also be made of the same material or different materials. If the terminal plate, the coupling terminal and the bus bar are possibly made of the same material, the electrical resistance must be smallest. However, as described above, in one embodiment of the present invention, the collector terminal and the terminal plate are coupled to each other by riveting, the terminal plate and the coupling terminal are coupled to each other by riveting, and the coupling terminal and the bus bar are coupled to each other using bolts and nuts. Therefore, even if functional components made of different materials are coupled to each other, the electrical resistance between the functional components is not greatly increased.

Although arrangements and actuation mechanisms in a terminal of a rechargeable battery and a method of assembling the same according to the present invention have been illustrated through particular embodiments, it should be understood that many variations and modifications may be made in those embodiments within the scope of the present invention by selectively combining all or some of the illustrated embodiments herein described.

What is claimed is:

1. A terminal of a rechargeable battery comprising:
   a collector terminal electrically coupled to an electrode assembly located within a case, wherein the collector terminal protrudes from the case;
   a terminal plate located outside of the case and coupled to the collector terminal; and
   a coupling terminal coupled to the terminal plate,
   wherein the terminal plate comprises:
   a terminal body having a throughhole through which the collector terminal extends and a coupling groove in which the coupling terminal is seated; and
   at least one coupling protrusion protruding from the coupling groove and coupled to the coupling terminal.

2. The terminal of claim 1, wherein the collector terminal passes through the terminal plate and is riveted thereto.

3. The terminal of claim 1, wherein the terminal plate passes through the coupling terminal and is riveted thereto.

4. The terminal of claim 1, wherein the coupling protrusion of the terminal plate passes through the coupling terminal and is riveted thereto.

5. The terminal of claim 4, wherein the coupling terminal comprises:
   a coupling body having a throughhole through which the coupling terminal extends; and
   a bolt portion extending from the coupling body.

6. The terminal of claim 1, wherein the coupling terminal comprises:
   a coupling body coupled to the terminal plate; and
   a bolt portion extending from the coupling body.

7. The terminal of claim 1, wherein the terminal plate and the coupling terminal comprise the same material.

8. The terminal of claim 1, wherein the terminal plate and the coupling terminal comprise different materials.

9. The terminal of claim 1, wherein an insulation member is located between the terminal plate and the case.

10. A method of assembling a terminal of a rechargeable battery, the method comprising:
    coupling a terminal plate to a collector terminal protruding from a case and riveting the collector terminal to the terminal plate; and
    coupling a coupling terminal to the terminal plate and riveting the terminal plate to the coupling terminal,
    wherein at least one coupling protrusion is formed in the terminal plate, the coupling protrusion extending through the coupling terminal and being riveted thereto.

* * * * *